United States Patent
Chai et al.

(10) Patent No.: US 10,778,375 B2
(45) Date of Patent: Sep. 15, 2020

(54) DATA TRANSMISSION METHOD, USER EQUIPMENT, AND BASE STATION

(71) Applicant: Huawei Technologies Co., Ltd., Shenzhen (CN)

(72) Inventors: Li Chai, Beijing (CN); Bo Lin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/041,511

(22) Filed: Jul. 20, 2018

(65) Prior Publication Data

US 2018/0332479 A1 Nov. 15, 2018

Related U.S. Application Data

(63) Continuation of application No. PCT/CN2017/070737, filed on Jan. 10, 2017.

(30) Foreign Application Priority Data

Jan. 20, 2016 (CN) .......................... 2016 1 0038569

(51) Int. Cl.
*H04L 1/18* (2006.01)
*H04W 76/10* (2018.01)
(Continued)

(52) U.S. Cl.
CPC .............. *H04L 1/18* (2013.01); *H04L 1/1822* (2013.01); *H04L 1/1825* (2013.01);
(Continued)

(58) Field of Classification Search
CPC ....... H04L 1/1812; H04L 1/18; H04L 1/1822; H04L 1/1825; H04L 1/1896;
(Continued)

(56) References Cited

U.S. PATENT DOCUMENTS

2011/0044218 A1   2/2011   Kaur et al.
2011/0292854 A1   12/2011  Terry et al.
(Continued)

FOREIGN PATENT DOCUMENTS

CN   102215530 A   10/2011
CN   102484885 A   5/2012
(Continued)

OTHER PUBLICATIONS

Da Silva et al., "Tight integration of new 5G air interface and LTE to fulfill 5G requirements," 2015 IEEE 81st Vehicular Technology Conference (VTC Spring), pp. 1-7, Institute of Electrical and Electronics Engineers, New York, New York (2015).
(Continued)

*Primary Examiner* — Rownak Islam
(74) *Attorney, Agent, or Firm* — Leydig, Voit & Mayer, Ltd.

(57) ABSTRACT

A data sending method is provided. The method includes: allocating, by a Media Access Control (MAC) entity of a first network node, data packets to at least one hybrid automatic repeat request HARQ unit of at least two cells, where the at least two cells use different radio access technologies RATs, the at least two cells share one HARQ unit or each of the at least two cells is corresponding to one HARQ unit, and the HARQ unit is a HARQ entity and/or a HARQ process; and sending, by the first network node, the data packets to a second network node by using the at least two cells. According to the foregoing solution, the data packets are allocated to the at least one HARQ unit of the at least two cells by using a shared MAC layer, so as to effectively reduce an end-to-end delay.

18 Claims, 7 Drawing Sheets

(51) Int. Cl.
*H04W 88/06* (2009.01)
*H04L 1/00* (2006.01)

(52) U.S. Cl.
CPC .......... *H04L 1/1896* (2013.01); *H04W 76/10* (2018.02); *H04W 88/06* (2013.01); *H04L 1/1887* (2013.01); *H04L 2001/0093* (2013.01)

(58) Field of Classification Search
CPC ......... H04L 1/1887; H04L 2001/0093; H04W 76/15; H04W 76/10; H04W 76/28; H04W 76/16; H04W 88/06
USPC ........................................................ 370/329
See application file for complete search history.

(56) References Cited

U.S. PATENT DOCUMENTS

| | | | |
|---|---|---|---|
| 2012/0057560 A1* | 3/2012 | Park | H04L 1/08 370/329 |
| 2012/0140743 A1* | 6/2012 | Pelletier | H04W 72/0453 370/335 |
| 2014/0079007 A1 | 3/2014 | Li et al. | |
| 2014/0177507 A1 | 6/2014 | Hsu | |
| 2015/0188680 A1 | 7/2015 | Li et al. | |
| 2015/0188681 A1 | 7/2015 | Li et al. | |
| 2015/0195766 A1 | 7/2015 | Lee et al. | |
| 2016/0095108 A1* | 3/2016 | Ryoo | H04L 5/0007 370/329 |
| 2018/0254868 A1* | 9/2018 | Saito | H04L 27/2611 |

FOREIGN PATENT DOCUMENTS

| | | |
|---|---|---|
| CN | 103004278 A | 3/2013 |
| CN | 103906141 A | 7/2014 |
| CN | 104718791 A | 6/2015 |
| CN | 105246106 A | 1/2016 |
| CN | 105634704 B | 4/2019 |
| EP | 1699249 A1 | 9/2006 |
| JP | 2013530636 A | 7/2013 |
| JP | 2014504474 A | 2/2014 |
| JP | 2015532566 A | 11/2015 |
| WO | 2013126859 A2 | 8/2013 |
| WO | 2014060544 A1 | 4/2014 |

OTHER PUBLICATIONS

Xing et al., "Multi-Rat Network Architecture," Working Group C "Communication Architectures and Technologies," White Paper, Version 2.0, Wireless World Research Forum (Nov. 2013).

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.0.0, pp. 1-507, 3rd Generation Partnership Project, Valbonne, France (Dec. 2015).

* cited by examiner

```
┌─────────────────────────────────────────────────────────────┐
│  A Media Access Control MAC entity of a first network node  │
│  allocates data packets to at least one HARQ unit           │
│  corresponding to at least two cells, where the at least    │──── 310
│  two cells use different RATs, and the at least two cells   │
│  are corresponding to one HARQ unit or each of the at least │
│  two cells is corresponding to one HARQ unit                │
└─────────────────────────────────────────────────────────────┘
                              │
                              ▼
┌─────────────────────────────────────────────────────────────┐
│  The first network node sends the data packets to a         │──── 320
│  second network node by using the at least two cells        │
└─────────────────────────────────────────────────────────────┘
                              │
                              ▼
┌─────────────────────────────────────────────────────────────┐
│  The second network node receives the data packets by       │──── 330
│  using the at least two cells                               │
└─────────────────────────────────────────────────────────────┘
                              │
                              ▼
┌─────────────────────────────────────────────────────────────┐
│  The second network node centrally processes, at a MAC      │
│  layer, the data packets received from the at least two     │──── 340
│  cells, and then transfers centrally processed data packets │
│  to an upper-layer protocol stack of the MAC layer          │
│  for processing                                             │
└─────────────────────────────────────────────────────────────┘
```

FIG. 3

DATA TRANSMISSION METHOD, USER EQUIPMENT, AND BASE STATION

CROSS-REFERENCE TO RELATED APPLICATIONS

This application is a continuation of International Application No. PCT/CN2017/070737, filed on Jan. 10, 2017, which claims priority to Chinese Patent Application No. 201610038569.6, filed on Jan. 20, 2016, The disclosures of the aforementioned applications are hereby incorporated by reference in their entireties.

TECHNICAL FIELD

Embodiments of the present invention relate to the wireless communications field, and in particular, to a data sending method, a data receiving method, and an apparatus.

BACKGROUND

Multi-radio network standard coordination is also referred to as multi-radio access technology coordination (Multi-RAT coordination). A main function of this technology is joint radio resource management among networks of different radio access technologies. In the following, the multi-radio network standard coordination is equivalent to the multi-RAT coordination. A radio access technology (RAT) that can be applied to this technology may include a Universal Mobile Telecommunications System (UMTS), a Global system for mobile communications (GSM), Code Division Multiple Access (CDMA), a wireless local area network (WLAN), Wireless Fidelity (WiFi), Long Term Evolution (LTE), a next generation network (such as 5G), or the like.

In an existing multi-RAT coordination technology, protocol stacks of radio access devices of different radio access networks are complete and independent, that is, each of the radio access devices of the different radio access networks has its own Packet Data Convergence Protocol (PDCP) layer, Radio Link Control (RLC) layer, and a Media Access Control (MAC) layer. An anchor in a network performs data offloading based on an Internet Protocol (IP) data packet, that is, data offloading is performed at an application layer above the PDCP layer. Then, a network device of each standard separately processes, at the PDCP layer, the RLC layer, the MAC layer, and a physical layer, a data packet that is offloaded to the standard. The anchor may also be referred to as a central control node. The standard in this specification refers to the RAT.

However, in the existing multi-RAT coordination technology, a delay of processing the data packet is quite long, and a delay requirement of a service, especially some services that have a demanding delay requirement, cannot be met.

SUMMARY

Embodiments of the present invention provide a data sending method, a data receiving method, and an apparatus, so as to reduce a data packet processing delay.

According to a first aspect, a data sending method is provided, including:

allocating, by a Media Access Control MAC entity of a first network node, data packets to at least one hybrid automatic repeat request HARQ unit corresponding to at least two cells, where the at least two cells use different radio access technologies RATs, the at least two cells share one HARQ unit or each of the at least two cells is corresponding to one HARQ unit, and the HARQ unit is a HARQ entity and/or a HARQ process; and sending, by the first network node, the data packets to a second network node by using the at least two cells.

Optionally, before the allocating, by a MAC entity of a first network node, data packets to at least one HARQ unit corresponding to at least two cells, the method further includes:

processing, by a Packet Data Convergence Protocol PDCP entity and/or a Radio Link Control RLC entity of the first network node, application layer data packets to obtain the data packets.

Optionally, before the allocating, by a MAC entity of a first network node, data packets to at least one HARQ unit corresponding to at least two cells, the MAC entity of the first network node processes application layer data packets to obtain the data packets. In this optional embodiment, an IP data packet is directly processed at a MAC layer, and does not need to be separately processed at a PDCP layer and an RLC layer, so that processing is more concise, and a delay is shorter.

Optionally, the allocating, by a MAC entity of a first network node, data packets to at least one HARQ unit corresponding to at least two cells includes:

allocating, by the MAC entity, the data packets to the at least one HARQ unit corresponding to the at least two cells according to at least one of: a quality of service parameter of a service, radio channel statuses of the different RATs, an average packet loss rate of each of the different RATs, average channel utilization of each of the different RATs, or characteristics of the different RATs.

The MAC entity allocates the data packets according to characteristics of the different RATs, so that a radio characteristic of a selected RAT better matches a characteristic of a service that needs to be served. In addition, a QoS parameter of the service, such as a tolerant rate, a delay, or a priority, radio channel statuses corresponding to physical layers of different standards, and the average packet loss rates and the average channel utilization of different RATs are considered during data packet allocation, so as to ensure a better packet allocation proportion and a minimum receive end delay.

Optionally, before the allocating, by a MAC entity, data packets to at least one HARQ unit corresponding to at least two cells, the method further includes:

receiving, by the first network node, a first message, where the first message includes at least one of the following information: radio channel statuses that are reported by the second network node and that are corresponding to the different RATs respectively, information about a RAT selected by the second network node, information about a cell corresponding to a RAT selected by the second network node, or information about a carrier corresponding to a RAT selected by the second network node;

wherein the allocating, by a MAC entity, data packets to at least one HARQ unit corresponding to at least two cells includes:

allocating, by the MAC entity according to the information in the first message, the data packets to the at least one HARQ unit corresponding to the at least two cells.

Optionally, the method further includes:

receiving, by the first network node, an uplink rate control parameter sent by the second network node, where the uplink rate control parameter is set according to characteristics and priorities of the RATs corresponding to the at least two cells;

wherein the allocating, by a MAC entity, data packets to at least one HARQ unit corresponding to at least two cells includes:

allocating, by the MAC entity according to the uplink rate control parameter, the data packets to the at least one HARQ unit corresponding to the at least two cells.

Optionally, before the allocating, by a MAC entity, data packets to at least one HARQ unit corresponding to at least two cells, the method further includes:

directly or indirectly sending, by the first network node, a buffer status report BSR to the second network node, where the BSR includes information about a RAT selected by the first network node or information about cells, carriers, logical channels, or logical channel groups corresponding to the different RATs; and/or directly or indirectly sending, by the first network node, a scheduling request SR to the second network node, where the SR includes information about the at least two RATs or information about cells, carriers, logical channels, or logical channel groups corresponding to the at least two RATs.

Optionally, after the directly or indirectly sending, by the first network node, a buffer status report BSR to the second network node, and/or directly or indirectly sending, by the first network node, a scheduling request SR to the second network node, the method further includes:

receiving, by the first network node, resource scheduling information sent by the second network node, where the resource scheduling information includes resources that are of the at least two cells and that are allocated by the second network node to the first network node;

wherein the allocating, by a MAC entity, data packets to at least one HARQ unit corresponding to at least two cells includes:

allocating, by the MAC entity, the data packets to the at least one HARQ unit corresponding to the at least two cells according to the resources that are of the at least two cells and that are allocated by the second network node to the first network node.

Each of the at least two cells is corresponding to one HARQ unit, one of the first network node and the second network node is an access network device, and the other one of the first network node and the second network node is a terminal device; and before the allocating, the method further includes:

sending, by the access network device, a second message to the terminal device, where the second message includes configuration information of HARQ round trip time RTT timing time of a cell corresponding to each of the different RATs, and/or configuration information of discontinuous reception DRX of a cell corresponding to each of the different RATs.

According to the foregoing configuration, in this embodiment of the present invention, TTI values and/or cyclic prefixes (cyclic prefix, CP) of different RATs may be different, and therefore, HARQ timing of HARQ entities and/or HARQ processes corresponding to cells of the different RATs may be different. In this case, a HARQ operation may still be performed.

Optionally, after the allocating, by a MAC entity, data packets to at least one HARQ unit corresponding to at least two cells, the method further includes: performing, by the MAC entity, mapping of different transport channels (transport channel) and logical channels (logical channel) of different RATs.

According to a second aspect, a data receiving method is provided, including:

receiving, by a second network node, data packets by using at least two cells, where the at least two cells use different radio access technologies RATs; and centrally processing, by the second network node at a MAC entity, the data packets received from the at least two cells, and then transferring centrally processed data packets to an upper-layer protocol stack of a MAC layer.

As a receive end of the data packets, the second network node receives the data packets by using antennas of different RATs, processes the data packets by using a HARQ process and a baseband processing unit at corresponding physical layers, and then sends processed data packets to a shared MAC layer to perform an operation such as demultiplexing. A data packet obtained after demultiplexing is performed at the shared MAC layer is an aggregated data packet. The MAC layer sends the processed data to an RLC layer and a PDCP layer for processing, and the data is finally sent to an application layer.

According to a third aspect, a network device is provided. The network device is a first network node, and includes:

a processor, configured to allocate, at a MAC layer, data packets to at least one hybrid automatic repeat request HARQ unit corresponding to at least two cells, where the at least two cells use different radio access technologies RATs, the at least two cells share one HARQ unit or each of the at least two cells is corresponding to one HARQ unit, and the HARQ unit is a HARQ entity and/or a HARQ process; and a transmitter, configured to send, to a second network node by using the at least two cells, the data packets allocated by the processor.

Optionally, before allocating, at the MAC layer, the data packets to the at least one HARQ unit corresponding to the at least two cells, the processor is further configured to:

process application layer data packets at a Packet Data Convergence Protocol PDCP layer and/or a Radio Link Control RLC layer to obtain the data packets; or process application layer data packets at the MAC layer to obtain the data packets.

Optionally, the processor is specifically configured to allocate, at the MAC layer in the following manner, the data packets to the at least one HARQ unit corresponding to the at least two cells:

allocating, at the MAC layer, the data packets to the at least one HARQ unit corresponding to the at least two cells according to at least one of: a quality of service parameter of a service, radio channel statuses of the different RATs, an average packet loss rate of each of the different RATs, average channel utilization of each of the different RATs, or characteristics of the different RATs.

Optionally, the network device further includes a receiver, where the receiver is configured to: before the processor allocates, at the MAC layer, the data packets to the at least one HARQ unit corresponding to the at least two cells, receive a first message, where the first message includes at least one of the following information: radio channel statuses that are reported by the second network node and that are corresponding to the different RATs respectively, information about a RAT selected by the second network node, information about a cell corresponding to a RAT selected by the second network node, or information about a carrier corresponding to a RAT selected by the second network node; and the processor is specifically configured to allocate, at the MAC layer in the following manner, the data packets to the at least one HARQ unit corresponding to the at least two cells: allocating, at the MAC layer according to the information in the first message, the data packets to the at least one HARQ unit corresponding to the at least two cells.

Optionally, the network device further includes a receiver, where the receiver is configured to receive an uplink rate control parameter sent by the second network node, where the uplink rate control parameter is set according to characteristics and priorities of the RATs corresponding to the at least two cells; and the processor is specifically configured to allocate, at the MAC layer in the following manner, the data packets to the at least one HARQ unit corresponding to the at least two cells: allocating, at the MAC layer according to the uplink rate control parameter, the data packets to the at least one HARQ unit corresponding to the at least two cells.

Optionally, the transmitter is further configured to: before the processor allocates, at the MAC layer, the data packets to the at least one HARQ unit corresponding to the at least two cells, directly or indirectly send a buffer status report BSR to the second network node, where the BSR includes information about a RAT selected by the first network node or information about cells, carriers, logical channels, or logical channel groups corresponding to the different RATs; and/or directly or indirectly send a scheduling request SR to the second network node, where the SR includes information about the at least two RATs or information about cells, carriers, logical channels, or logical channel groups corresponding to the at least two RATs.

Optionally, the network device further includes a receiver, where the receiver is configured to receive resource scheduling information sent by the second network node, where the resource scheduling information includes resources that are of the at least two cells and that are allocated by the second network node to the first network node; and the processor is specifically configured to allocate, at the MAC layer in the following manner, the data packets to the at least one HARQ unit corresponding to the at least two cells: allocating, at the MAC layer, the data packets to the at least one HARQ unit corresponding to the at least two cells according to the resources that are of the at least two cells and that are allocated by the second network node to the first network node.

Optionally, each of the at least two cells is corresponding to one HARQ unit, one of the first network node and the second network node is an access network device, and the other one of the first network node and the second network node is a terminal device; and the transmitter is further configured to: before the processor allocates, at the MAC layer, the data packets to HARQ processes of at least two RAT networks, send a second message to the terminal device, where the second message includes configuration information of HARQ round trip time RTT timing time of a cell corresponding to each of the different RATs, and/or configuration information of discontinuous reception DRX of a cell corresponding to each of the different RATs.

According to a fourth aspect, a network device is provided. The network device is a second network node, and includes a receiver and a processor; where the receiver is configured to receive data packets by using at least two cells, where the at least two cells use different radio access technologies RATs; and the processor is configured to: centrally process, at a MAC layer, the data packets received from the at least two cells, and then transfer centrally processed data packets to an upper-layer protocol stack of the MAC layer.

Optionally, the data packets are different data packets of a same service; or the data packets are same data packets of a same service; or the data packets are data packets of different services.

Optionally, the data packets include a first data packet and a second data packet, the first data packet is allocated to a first cell in the at least two cells, the second data packet is allocated to a second cell in the at least two cells, and the first data packet and the second data packet are different data packets of a same service, or the first data packet and the second data packet are data packets of different services.

The at least two cells share one HARQ entity, the first data packet and the second data packet are corresponding to different HARQ processes respectively, and the different HARQ processes are maintained by the HARQ entity; or each of the at least two cells is corresponding to one HARQ entity, the first cell is corresponding to a first HARQ entity, the second cell is corresponding to a second HARQ entity, the first data packet is corresponding to a first HARQ process, the first HARQ process is maintained by the first HARQ entity, the second data packet is corresponding to a second HARQ process, and the second HARQ process is maintained by the second HARQ entity.

Optionally, the data packets include a first data packet and a second data packet, the first data packet and the second data packet are same data packets of a same service, the first data packet is allocated to a first cell in the at least two cells, and the second data packet is allocated to a second cell in the at least two cells.

The at least two cells share one HARQ entity, the first data packet and the second data packet are corresponding to one HARQ process, and the HARQ process is maintained by the HARQ entity; or each of the at least two cells is corresponding to one HARQ entity, the first cell is corresponding to a first HARQ entity, the second cell is corresponding to a second HARQ entity, the first data packet is corresponding to a first HARQ process, the first HARQ process is maintained by the first HARQ entity, the second data packet is corresponding to a second HARQ process, and the second HARQ process is maintained by the second HARQ entity.

Optionally, a characteristic of a RAT includes at least one of transmission time interval TTI, a transport format TF of a transport channel, or a coding parameter. The coding parameter includes at least one of a size of error correcting code, a coding type, or a coding rate. Characteristics of the different RATs include at least one of: a transmission time interval TTI of each of the different RATs, a transport format TF of a transport channel of each of the different RATs, or a coding parameter of each of the different RATs. The coding parameter includes at least one of a size of error correcting code, a coding type, or a coding rate.

Optionally, configuration information of DRX includes a type of a physical channel that needs to be listened on by a terminal device and/or information about HARQ RTT timing time of a cell corresponding to the configuration information of DRX.

Optionally, the first network node in the embodiments of the present invention may be one of a terminal device, an access network device, or a core network device.

The RAT described in the embodiments of the present invention may include one or more serving cells, and the serving cell in this specification is referred to as a cell. A serving cell may be a carrier, or may be a cell.

In the embodiments of the present invention, the shared MAC layer is used for allocating the data packets to the at least one hybrid automatic repeat request HARQ unit corresponding to the at least two cells, so that service data of radio networks of different standards may be allocated at the MAC layer, and corresponding data packets allocated to cells of different RATs do not have long delays at the PDCP layer and the RLC layer, thereby effectively reducing an end-to-end delay. Because a data packet processing delay is reduced, an average residence serving time and a waiting time in a buffer are accordingly reduced. In this way, data packets of different RATs have only HARQ processing delays. Therefore, the delays are low and may be ignored. In terms of an effect, this is equivalent to a fact that frequency bands of different standards are used for processing the data packets, so as to achieve a carrier aggregation (CA) effect.

BRIEF DESCRIPTION OF DRAWINGS

FIG. 3 is a flowchart of a data sending method and a data receiving method according to an embodiment of the present invention;

DESCRIPTION OF EMBODIMENTS

The following describes the technical solutions in the embodiments of the present invention with reference to the accompanying drawings in the embodiments of the present invention. It should be noted that the embodiments of the present invention and characteristics of the embodiments may be combined with each other in a case without a conflict.

For example, multi-RAT coordination is performed by using UMTS and LTE. Protocol stacks of network devices of both existing standards (UMTS and LTE) are complete and independent. For example, an anchor performs offloading based on an Internet Protocol (IP) data packet. The anchor is configured to perform joint radio resource management on radio resources of at least two standards. The anchor may be an independent network element, or may be used as a logic function node and disposed inside a network element such as a base station or an RNC. In such a joint radio resource management mode, a network device of each standard (RAT) still needs to successively process data at all protocol layers of the network device, including a PDCP layer, an RLC, and a MAC layer.

Figure 1:
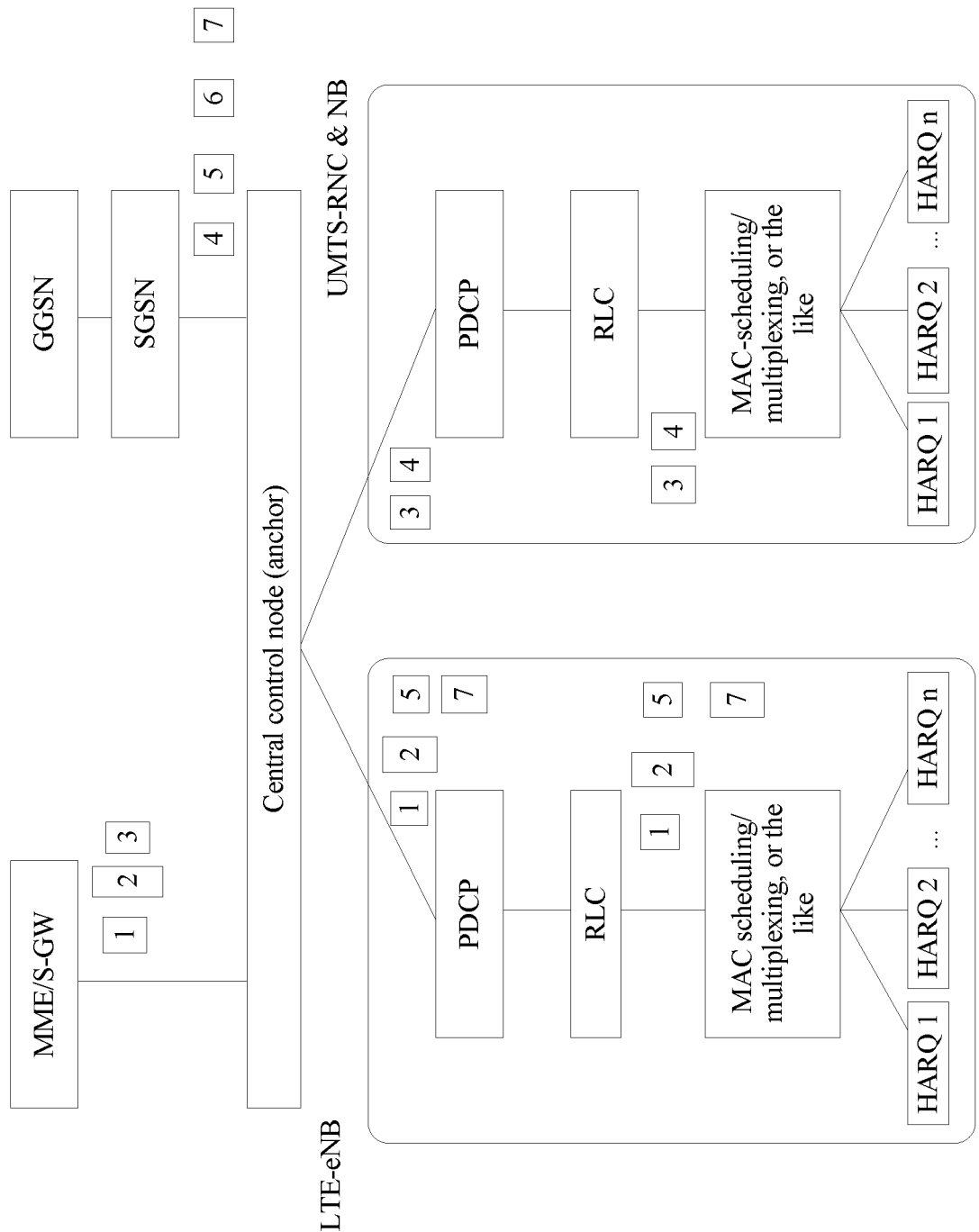
FIG. 1 is a schematic diagram of a network architecture of a multi-radio network standard coordination technology.

As shown in FIG. 1, it can be learned that in the network architecture, a mobility management entity (MME) or a serving gateway (S-GW) in an LTE network sends data packets 1, 2, and 3 to a central control node. A serving GPRS support node (SGSN, where GPRS is a general packet radio system) in a UMTS network sends data packets 4, 5, 6, and 7 to the central control node. In FIG. 1, the central control node may be integrated into an evolved Node B (eNB) in the LTE network. The central control node offloads the data packets 1, 2, 5, and 7 to the eNB of the LTE network, and offloads the data packets 3 and 4 to a radio network controller (RNC) and/or a node B (NodeB, NB) in the UMTS network. Description is given by using the NB as an example. The eNB and the NB separately process the data packets offloaded to the eNB and the NB at the PDCP layer, the RLC layer, and the MAC layer.

In this specification, a manner in which the data packet needs to be processed at each protocol layer is referred to as loose coupling. Processing delays at these upper layer (including the PDCP layer, the RLC layer, and the MAC layer) protocol stacks can be up to hundreds of milliseconds (ms). However, during joint processing, delays of different network devices need to be taken into consideration in data aggregation. Therefore, in the current multi-RAT coordination technology, a processing delay is still quite long. Such a long delay cannot meet a delay requirement of a rapidly developing communication service, especially a low delay and high reliability requirement of convergence of the LTE network and a next-generation 5G network.

Therefore, an embodiment of the present invention provides a new technology that can implement tight coupling coordination among multi-standard radio networks, so as to ensure smooth convergence of different network deployment. In this embodiment of the present invention, radio access networks of different standards share the PDCP layer (or referred to as a PDCP entity), the RLC layer (or referred to as an RLC entity), and the MAC layer (or referred to as a MAC entity). Optionally, the radio access networks of different standards may share the MAC layer, and functions of the PDCP layer and the RLC layer are implemented by the MAC layer. In this embodiment of the present invention, data packets of the radio networks of different standards can be offloaded at the MAC layer. After offloading, a network device of each standard needs to process the data packet only at a HARQ entity and a physical layer, or a network device of each standard needs to process the data packet only at a physical layer, and does not need to successively process the data packet at the PDCP layer, the RLC layer, and the MAC layer, so as to map the data packet onto the radio networks of different standards at the MAC layer.

In the prior art, a network device of each RAT still needs to successively process a data packet at a PDCP layer, an RLC layer, and a MAC layer of the network device. By comparison, in this embodiment of the present invention, processing is centrally performed at a PDCP layer, an RLC layer, and a MAC layer of each RAT, and the MAC layer allocates data packets to a HARQ process and/or a HARQ entity maintained for at least two RAT cells. Such a manner is referred to as tight coupling in this specification. A HARQ processing delay at the MAC layer is only a few milliseconds (ms), processing is centrally performed at the PDCP layer, the RLC layer, and the MAC layer of different standards in this embodiment of the present invention, the data packets may be allocated according to a radio link status reported by the physical layer, and the data packets of different standards do not have long delays at the PDCP layer and the RLC layer. Therefore, this effectively reduces an end-to-end delay. Because a data packet processing delay is reduced, an average residence serving time and a waiting time in a buffer are accordingly reduced. In this way, data packets of different RATs have only HARQ processing delays. Therefore, the delays are low and may be ignored. In terms of an effect, this is equivalent to a fact that frequency bands of different standards are used for processing the data packets, so as to achieve a carrier aggregation (CA) effect.

It should be noted that a system in this embodiment of the present invention includes network elements of at least two RAT networks, and further includes one central control node. The central control node obtains a MAC data packet after separately processing an IP data packet (an application layer data packet) at a PDCP layer, an RLC layer, and a MAC layer, and offloads the MAC data packet to each RAT network. The central control node may be alternatively referred to as an anchor or the like, may be an independent network element, or may be integrated into a network element of a RAT network.

It can be learned that a structure of a protocol stack of the network architecture in this embodiment of the present invention is different from that of a protocol stack of a network architecture in the prior art. A central control node in the prior art offloads the data packets at the PDCP layer, but the central control node in this embodiment of the present invention offloads the data packets at the MAC layer. Therefore, the structure of the protocol stack of the central control node in this embodiment of the present invention is different from that in the prior art.

Figure 2:
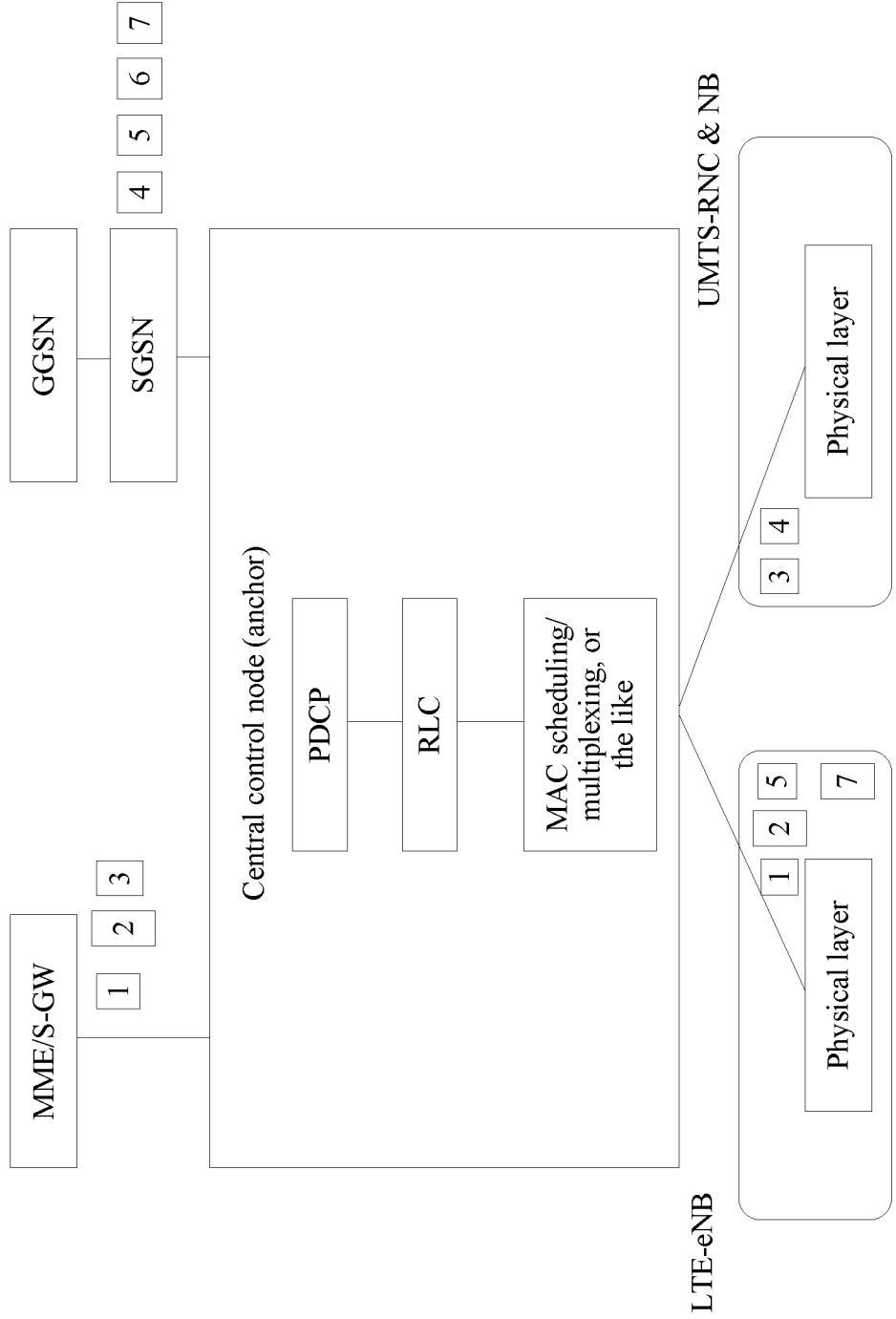
FIG. 2 is a schematic diagram of a network architecture of a multi-radio network standard coordination technology according to an embodiment of the present invention.

For example, as shown in FIG. 2, UMTS and LTE are still used as examples. It can be learned that in the network architecture, an MME or an S-GW in an LTE network sends data packets 1, 2, and 3 to a central control node, and an SGSN in a UMTS network sends data packets 4, 5, 6, and 7 to the central control node. In FIG. 2, the central control node may be integrated into an eNB in the LTE network, or may be integrated into another network element. The central control node successively processes received data packets at a PDCP layer, an RLC layer, and a MAC layer. A MAC entity schedules the data packets 1, 2, 5, and 7 to the eNB of the LTE network, and schedules the data packets 3 and 4 to an RNC and/or an NB of the UMTS network. Description is given by using the NB as an example, and the eNB and the NB process, at a physical layer, the data packets offloaded to the eNB and the NB.

Further, the network elements of the at least two RAT networks in this embodiment of the present invention may be integrated into one device. In this case, although in one device, the network elements are actually implemented by using different RATs. For example, alternatively, the eNB and the NB shown in FIG. 2 may be integrated into a same device, and implemented by the same device.

In the foregoing, description is given by using a downlink service as an example. According to improvement in this embodiment of the present invention, a multi-RAT coordination technology may also be applied to an uplink service. For the uplink service, the central control node may be, for example, a terminal device. After the terminal device performs processing at the PDCP layer, the RLC layer, and the MAC layer, a MAC entity of the terminal device allocates the data packets 1, 2, 5, and 7 to the eNB of the LTE network, and allocates the data packets 3 and 4 to the UMTS network. Specifically, the terminal device may separately request corresponding uplink resources from the eNB and the NB according to a data packet allocation status, and sends the data packets to the eNB and the NB by using the obtained uplink resources. The eNB and the NB send respective data packets to a network element that has a function of the central control node. The network element aggregates the data packets sent by the eNB and the NB. The network element that has the function of the central control node may be one of the eNB and the NB or another network element in the network.

The terminal device in this embodiment of the present invention may refer to a device that provides a user with voice and/or data connectivity, a handheld device that has a wireless connection function, or another processing device connected to a wireless modem. A wireless terminal may communicate with one or more core networks through a radio access network (for example, RAN, Radio Access Network). The wireless terminal may be a mobile terminal, such as a mobile phone (or may be referred to as a "cellular" phone), or a computer with a mobile terminal, for example, a portable, pocket-sized, handheld, computer built-in, or in-vehicle mobile apparatus, that exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile station, a remote station, an access point, a remote terminal, an access terminal, a user terminal, a user agent, a user device, or user equipment.

It should be noted that the RAT in this embodiment of the present invention may also be referred to as a standard. For example, different RATs may alternatively be referred to as different standards. The two definitions are not distinguished in this embodiment of the present invention. In addition, the MAC layer in this embodiment of the present invention may alternatively be referred to as a MAC entity, and the two definitions are not distinguished in this embodiment of the present invention either.

Further, the network architecture in this embodiment of the present invention may also be applied to coordination between at least two networks of UMTS, GSM, CDMA, WLAN, WiFi, LTE, and a next generation network (for example, 5G), and/or coordination among different RATs of 5G. Different RATs of the next generation network may have different waveforms, frame structures, coding technologies (such as Turbo code, low-density parity-check (LDPC) code, or polar code), and demodulation technologies, and use other new technologies, for example, one or more of a new beamforming technology (such as filtered OFDM), a new multi-access technology (such as sparse code multiple access (SCMA)), and a new channel coding technology.

The central control node in this embodiment of the present invention may be integrated into a plurality of types of network devices, such as a terminal device or an access network device, or the central control node may be another device that sends data to the terminal device, or a core network device, or the like.

In this embodiment of the present invention, the access network device may be a base station, such as an evolved node B (eNB or e-NodeB) in LTE or LTE-A, or a NodeB or an RNC in UMTS, or may be a base station in another communications system, such as a base transceiver station (BTS) or a base station controller (BSC), or may be another device that sends data to the terminal device, such as a small cell, a relay node, a transmission point (TP), or an access point (AP). This is not limited in this embodiment of the present invention.

The core network device may be a core network device in any RAT, for example, an MME, an S-GW, or a serving GPRS support node (SGSN) of 2G or 3G.

In this embodiment of the present invention, a network element that has the function of the central control node is referred to as a first network node, that is, a network element that implements an offloading function is referred to as the first network node. The network device may be an independent network element, or may be integrated into an existing network element. The existing network element may be any one of the foregoing network devices. Alternatively, the existing network element may be another network device that can implement the same function in the future. A data receive end is referred to as a second network node, that is, a network element that aggregates data received from RATs is referred to as the second network node.

In this embodiment, for the uplink service, the first network node may be a terminal device, and the second network node may be a network element in an access network, or may be a network element of a core network of a RAT, or may be an independent network element in a network. The second network node has a data aggregation function. The terminal device is a network device that has a shared MAC entity. The terminal device processes data packets at the MAC layer, and then offloads the data packets to different RAT cells, and network devices of the different RAT cells process the data packets at the physical layer.

For the downlink service, the first network node may be a network device that has a shared MAC entity, and the second network node may be a network element in an access network, or may be a network element of a core network of a RAT, or may be an independent network element in a network. The first network node processes downlink data packets at the MAC layer, and then offloads the data packets to RAT cells, and network devices of different RAT cells process the data packets at the physical layer, and then sends the data packets to a terminal device.

In addition, the method in this embodiment of the present invention may further be applied to device-to-device (D2D) communication, machine-to-machine (M2M) communication, vehicle-to-vehicle (V2V) communication, or a plurality of other similar communication manners. In these communication manners, the first network node and the second network node are two nodes that participate in the D2D, M2M, or V2V communication, or other communication. The first network node has a shared MAC entity. The first network node allocates the data packets to different standards at the MAC layer, and sends the data packets to the second network node by using the different standards.

Sharing means that MAC layers of the data packets offloaded to all RATs are processed by the MAC entity, and a network entity of each RAT does not need to perform processing at the MAC layer.

To achieve the effect described above, the embodiments of the present invention provide a plurality of embodiments. In the following, the solutions in the embodiments of the present invention are described in detail with reference to the accompanying drawings.

FIG. 3 is a flowchart of a data sending method and a data receiving method according to an embodiment of the present invention. As shown in FIG. 3, the method includes the following steps.

Step 310: A Media Access Control MAC entity of a first network node allocates data packets to at least one HARQ unit corresponding to at least two cells, where the at least two cells use different RATs, the at least two cells are corresponding to one HARQ unit or each of the at least two cells is corresponding to one HARQ unit, and the HARQ unit is a HARQ entity and/or a HARQ process.

Step 320: The first network node sends the data packets to a second network node by using the at least two cells.

Step 330: The second network node receives the data packets by using the at least two cells.

Step 340: The second network node centrally processes, at a MAC layer, the data packets received from the at least two cells, and then transfers centrally processed data packets to an upper-layer protocol stack of the MAC layer for processing.

It should be noted that although at least two cells are included in this embodiment of the present invention, and the at least two cells use different RATs, another cell may further be included in this embodiment of the present invention, and a RAT used by the another cell may be the same as one of the RATs used by the at least two cells. For cells of the same RAT, processing may be performed according to any one of the at least two cells in this embodiment of the present invention. The RAT described in this embodiment of the present invention may include one or more serving cells, and the serving cell in this specification is referred to as a cell. A serving cell may be a carrier, or may be a cell.

The at least one HARQ unit corresponding to the at least two cells in this embodiment of the present invention may be at least one HARQ unit maintained by the first network node for the at least two cells. That the at least two cells are corresponding to one HARQ unit may be that the at least two cells share one HARQ unit, that is, the HARQ unit is shared by the at least two cells. Alternatively, each of the at least two cells is corresponding to one HARQ unit, that is, the cell and the HARQ unit are in a one-to-one correspondence.

Further, the data packets in this embodiment of the present invention may be different data packets of a same service, or may be same data packets of a same service, or may be data packets of different services. For the different data packets of the same service and the data packets of the different services, the solutions in this embodiment of the present invention can improve data packet transmission efficiency, and increase a speed of sending the data packets to a receive end. For the same data packets of the same service, the solutions in this embodiment of the present invention can improve transmission reliability of the data packets.

Further, as described above, the HARQ unit in this embodiment of the present invention may be a HARQ entity, or may a HARQ process, or may be a HARQ entity and a HARQ process. The MAC entity maintains at least one HARQ unit, and when the MAC entity maintains one HARQ unit, the at least two cells share the HARQ unit. When the MAC entity maintains at least two HARQ units, each of the at least two cells is corresponding to one HARQ unit.

For example, in an embodiment, the data packets are the different data packets of the same service, or are the data packets of the different services, and the data packets include a first data packet and a second data packet. The MAC entity of the first network node allocates the first data packet to a first cell in the at least two cells, and allocates the second data packet to a second cell in the at least two cells. In this case, when the at least two cells share one HARQ entity, the first data packet and the second data packet are corresponding to different HARQ processes respectively, and the different HARQ processes are maintained by the HARQ entity. When each of the at least two cells is corresponding to one HARQ entity, the first cell is corresponding to a first HARQ entity, the second cell is corresponding to a second HARQ entity, the first data packet is corresponding to a first HARQ process, the first HARQ process is maintained by the first HARQ entity, the second data packet is corresponding to a second HARQ process, and the second HARQ process is maintained by the second HARQ entity.

For another example, in another embodiment, the data packets are the same data packets of the same service, the data packets include a first data packet and a second data packet, and the first data packet and the second data packet are the same data packets of the same service, that is, the first data packet and the second data packet are the same data packets. The first data packet is allocated to a first cell in the at least two cells, and the second data packet is allocated to a second cell in the at least two cells. When the at least two cells share one HARQ entity, the first data packet and the second data packet are corresponding to one HARQ process, and the HARQ process is maintained by the HARQ entity. In this case, it may also be considered that the at least two cells may share one HARQ process. Alternatively, when each of the at least two cells is corresponding to one HARQ entity, the first cell is corresponding to a first HARQ entity, the second cell is corresponding to a second HARQ entity, the first data packet is corresponding to a first HARQ process, the first HARQ process is maintained by the first HARQ entity, the second data packet is corresponding to a second HARQ process, and the second HARQ process is maintained by the second HARQ entity.

When the at least two cells share one HARQ entity, regardless of whether network devices that control the at least two cells are independent network elements or are integrated into the first network node, the HARQ entity is disposed on the first network node, and the first network node performs HARQ control, including data packet retransmission or the like.

When each of the at least two cells is corresponding to one HARQ entity, if network devices that control the at least two cells are independent network elements, the HARQ entity corresponding to each of the at least two cells may be disposed on the first network node, and the first network node performs HARQ control, including data packet retransmission or the like. Alternatively, the HARQ entity corresponding to each of the at least two cells may be disposed on a corresponding network device of each of the at least two cells, and the network device performs corresponding HARQ control on a data packet allocated to a cell controlled by the network device.

For example, if the first network node is an eNB in an LTE network, the different RATs corresponding to the two cells include LTE and UMTS, and a UMTS network element is an NB, the eNB allocates the data packets to the eNB of LTE and the NB of UMTS. For the first case, that is, the at least two cells share one HARQ entity, the HARQ entity is disposed on the eNB, and the eNB performs central HARQ control. For the second case, HARQ entities corresponding to cells of LTE and UMTS are disposed on the eNB and the NB respectively, the eNB performs HARQ control on a data packet allocated to LTE, and the NB performs HARQ control on a data packet allocated to UMTS. Alternatively, both HARQ entities corresponding to cells of LTE and UMTS are disposed on the eNB, and the eNB performs HARQ control on data packets allocated to LTE and UMTS.

Further, another cell may further be included in this embodiment of the present invention, and the another cell may share one HARQ unit with the at least two cells. That is, in cells included in this embodiment of the present invention, some cells may share one HARQ unit, and the other cells are corresponding to different HARQ units. Certainly, the another cell may be corresponding to one HARQ unit, that is, in cells included in this embodiment of the present invention, each cell may be corresponding to one HARQ unit.

Therefore, that the MAC entity of the first network node allocates the data packets to the at least one HARQ unit corresponding to the at least two cells may include: The MAC entity allocates the data packets to the HARQ entity shared by the at least two cells, or the MAC entity allocates the data packets to different HARQ entities respectively corresponding to the at least two cells, or the MAC entity allocates the data packets to different HARQ processes of the HARQ entity shared by the at least two cells or to different HARQ processes of different HARQ entities, or the MAC entity allocates the data packets to a same HARQ process of the HARQ entity shared by the at least two cells.

In an optional embodiment, before step 310, this embodiment of the present invention may further include: A PDCP entity and/or an RLC entity perform/performs corresponding PDCP layer and/or RLC layer processing on application layer data packets, and may perform MAC layer processing to obtain the data packets. That is, in addition to the shared MAC entity, the first network node may include a shared PDCP entity and/or a shared RLC entity. In this embodiment of the present invention, it is possible that only the PDCP entity and the MAC entity are shared entities, and a function of the RLC entity may be implemented by the MAC entity or the PDCP entity; or in this embodiment of the present invention, it is possible that only the RLC entity and the MAC entity are shared entities, and a function of the PDCP entity may be implemented by the RLC entity; or in this embodiment of the present invention, it is possible that all of the PDCP entity, the RLC entity, and the MAC entity are shared entities, and a function of each layer is implemented by a corresponding entity. In this embodiment, the data packets may be offloaded at the MAC layer, and the shared PDCP entity, RLC entity, and MAC entity centrally process data packets offloaded to different RATs, so as to reduce processing delays of the PDCP entity, the RLC entity, and the MAC entity in the different RATs.

In another optional embodiment, before step 310, this embodiment of the present invention may further include: The MAC entity may directly process application layer data packets, that is, the MAC entity implements functions of both the PDCP entity and the RLC entity. This embodiment of the present invention can achieve the effect of the foregoing embodiment. In addition, based on the foregoing embodiment, in this embodiment of the present invention, processing does not need to be separately performed at the PDCP layer and the RLC layer, so that processing is more concise, and a delay is shorter.

In the following, a specific example is used for further describing an implementation in which the at least two cells share the PDCP entity, the RLC entity, and the MAC entity, and an implementation in which the at least two cells share the MAC entity, and do not need the PDCP layer and the RLC layer. It should be noted that content in the following is only further description of the description in the foregoing embodiment, and all characteristics in the content may be applied to the foregoing embodiment, and be combined with the foregoing embodiment.

For the first optional embodiment, the shared PDCP layer, RLC layer, and MAC layer of the first network node perform central processing on service data of different-standard radio networks, and the MAC layer of the first network node maps the service data onto cells of the different-standard radio networks. Therefore, the MAC layer may be referred to as the shared MAC layer. The following describes this embodiment in detail with reference to FIG. 4 and FIG. 5.

Figure 4:
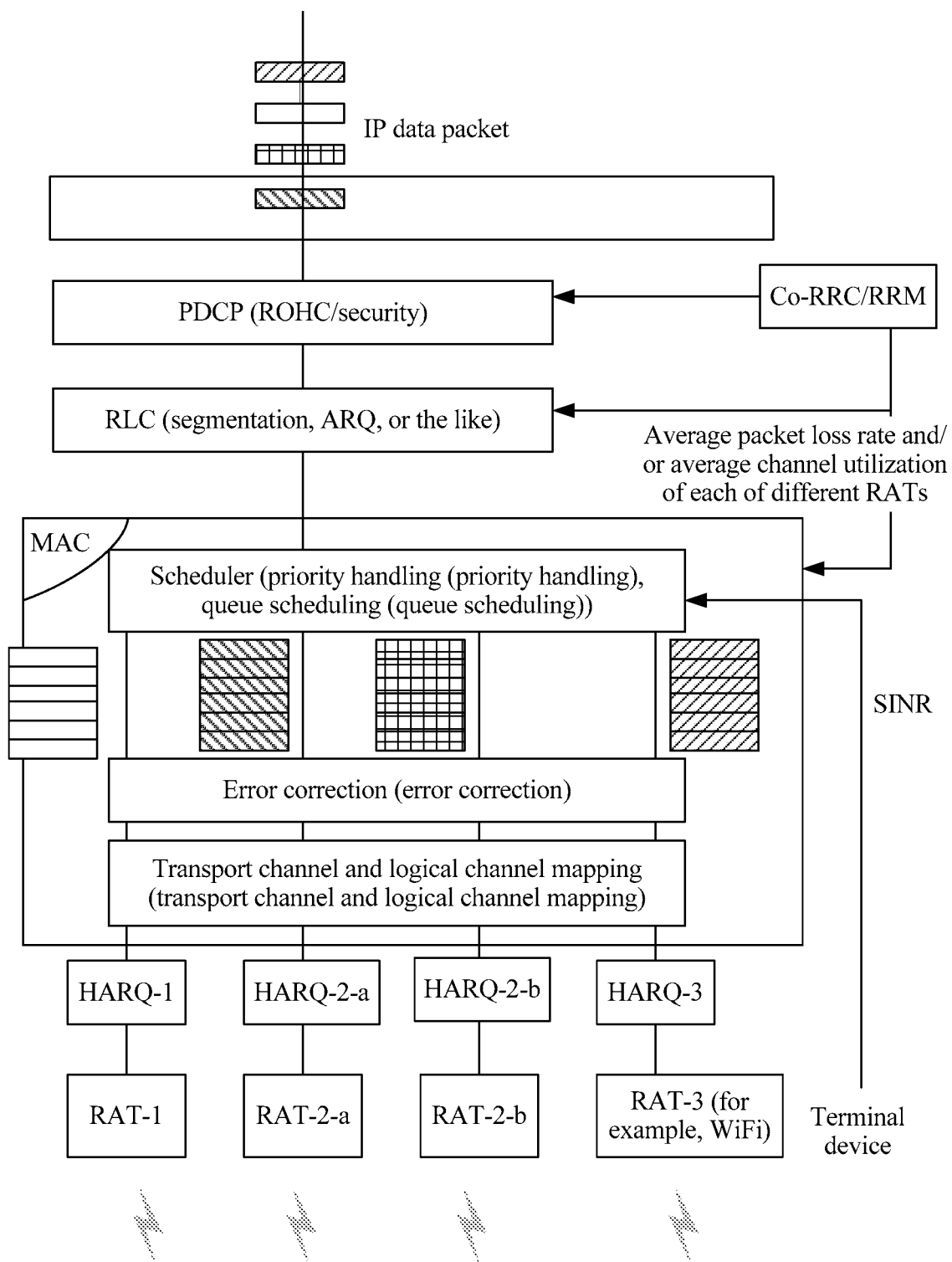
FIG. 4 is a schematic structural diagram of a protocol stack according to an embodiment of the present invention.

A RAT-1, a RAT-2-a, a RAT-2-b, and a RAT-3 in FIG. 4 may be at least two types of RATs of UMTS, GSM, CDMA, WLAN, WiFi, LTE, a next generation network (for example, 5G), different radio access technologies (RAT) of a next generation network, or the like. For example, the RAT-3 is WiFi.

In this embodiment, radio access networks of different standards share a PDCP entity, an RLC entity, and a MAC entity. If a data packet is offloaded to WiFi, a PDCP layer and an RLC layer may be transparent to WiFi, that is, PDCP layer processing and RLC layer processing are not performed. A first network node that has an offloading function centrally processes to-be-sent IP data packets (that is, application layer data packets) at the PDCP layer, the RLC layer, and a MAC layer. A scheduling functional entity (such as a scheduler in FIG. 4) at the MAC layer offloads the data packets to cells of different RATs, and the offloaded data packets are separately sent to a terminal device by using the cells of the different RATs, or data offloaded to the cells of the different RATs is sent to network devices corresponding to different cells. Each network device performs physical layer processing, for example, performs HARQ process processing, and then the network devices of the different RATs send, to UE, data packets on which physical layer processing is performed by the network devices.

Offloading may be performed on a service basis, that is, different services are scheduled to HARQ processes corresponding to different RATs. Alternatively, offloading is performed on a data packet basis, that is, different data packets of a service are scheduled to HARQ processes corresponding to different RATs. Certainly, offloading may also be performed on a service and a data packet basis. For details, refer to the manner described above.

Further, to improve data sending reliability, the MAC layer may allocate some or all of data packets of a same service to the HARQ processes corresponding to the cells of the different RATs, or allocate some or all of same data packets to the HARQ processes corresponding to the cells of the different RATs. For details, refer to the description in the foregoing.

Figure 5:
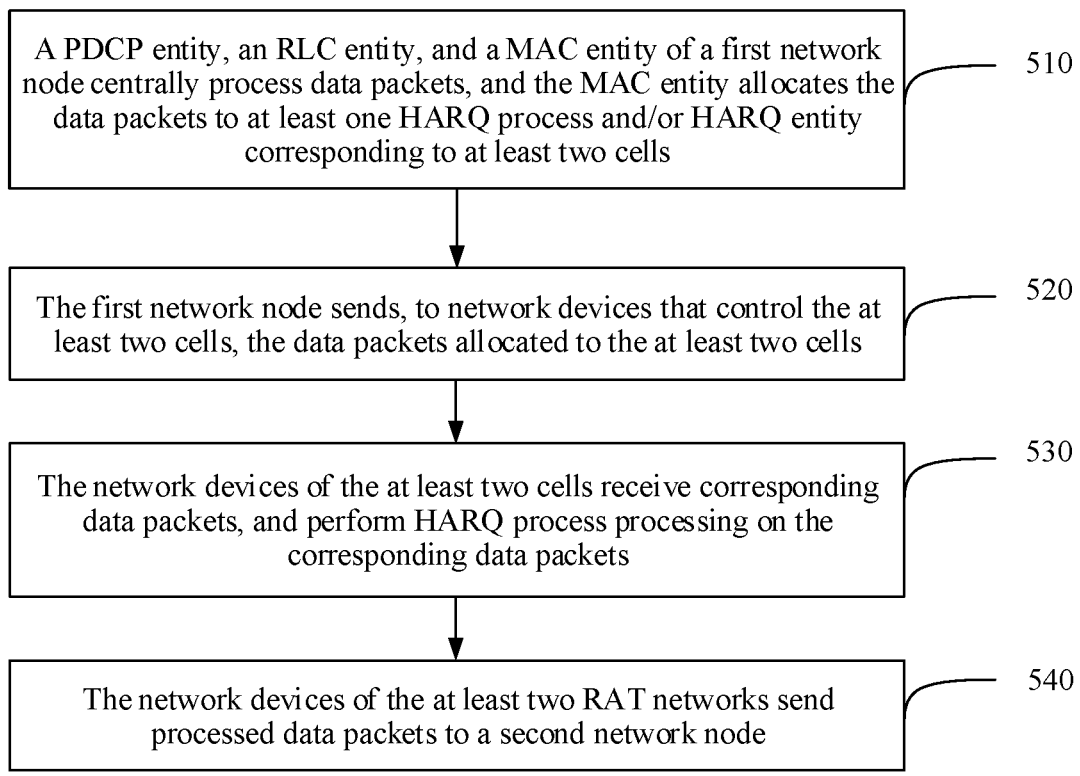
FIG. 5 is another schematic flowchart of a data sending and receiving method according to an embodiment of the present invention.

FIG. 5 is a schematic flowchart of a data sending and receiving method according to an embodiment of the present invention. The method includes the following steps.

Step 510: A PDCP entity, an RLC entity, and a MAC entity of a first network node centrally process data packets, and the MAC entity allocates the data packets to at least one HARQ process and/or HARQ entity corresponding to at least two cells, where the at least two cells use different RATs.

Step 520: The first network node sends, to network devices that control the at least two cells, the data packets allocated to the at least two cells.

It should be noted that step 520 is an optional step. A network device of a RAT network mentioned in each embodiment of the present invention may be an independent network element, or may be a functional entity. For example, the network device is integrated into one network element with a network device of another RAT network, or is integrated into one network element with the first network node. In this case, the first network node does not need to send, to the network devices that control the at least two cells, the data packets allocated to the at least two cells, but directly sends the data packets to a second network node by using the at least two cells. In this way, step 530 and step 540 do not need to be performed either.

Step 530: The network devices of the at least two cells receive corresponding data packets, and perform HARQ process processing on the corresponding data packets.

Step 540: The network devices of the at least two RAT networks send processed data packets to a second network node.

All or some of the network devices of the at least two cells may be integrated into the first network node.

In step 510, the data packets may be allocated by a data scheduling entity (or referred to as a scheduler) of the MAC entity.

In addition, this embodiment of the present invention may be applied to device-to-device (D2D) communication. In this case, the first network node may also be a terminal device of the D2D communication. The terminal device sends the data packets to another terminal device by using different standards. In this case, the step in which the first network node sends, to network devices of corresponding RAT networks, the data packets allocated to the at least two cells does not exist. Instead, the first network node sends, to the second network node, the data packets allocated to the at least two cells.

For ease of description, in the following embodiment, for a downlink service, the first network node is described by using an eNB as an example, and the second network node is a terminal device. For an uplink service, the first network node is a terminal device, and the second network node is an eNB.

Further, as described above, the data packets may be different data packets of a same service, same data packets of a same service, or data packets of different services. A system includes two types of RATs: an LTE network and a UMTS network. The first network node is integrated into the eNB.

For example, there are two different services: a service A and a service B. The eNB may schedule a data packet that is sent by a core network device and that is of the service A to the LTE network, and schedule a data packet that is sent by the core network device and that is of the service B to the UMTS network. The eNB sends the data packet of the service A to the terminal device, and an NB sends the data packet of the service B to the terminal device.

For another example, there is a service, and the service has a plurality of to-be-sent data packets: a data packet A, a data packet B, a data packet C, and a data packet D. The eNB may schedule the data packet A and the data packet B to the LTE network, and schedule the data packet C and the data packet D to the UMTS network. The eNB sends the data packet of the service A to the terminal device, and an NB sends the data packet of the service B to the terminal device.

Certainly, the foregoing two different solutions may also be combined. For example, there are three different services: a service A, a service B, and a service C. The eNB may schedule a data packet of the service A to the LTE network, schedule a data packet of the service B to the UMTS network, schedule a data packet A and a data packet B of the service C to the LTE network, and schedule a data packet C and a data packet D of the service C to the UMTS network.

In addition, the eNB may schedule a same data packet to the LTE network and the UMTS network. In this case, because the same data packet is sent by using different networks, the data packet is sent twice. Therefore, transmission reliability of the data packet is improved.

After receiving application layer data packets, the PDCP entity, the RLC entity, and the MAC entity may process the data packets. Processing of each entity includes corresponding processing in the prior art. For example, as shown in FIG. 4, for the PDCP entity, robust header compression (ROHC) processing and/or security-related processing at the PDCP layer are/is included; for the RLC entity, segmentation and/or cascading processing, automatic repeat request (ARQ) processing, and the like at the RLC layer are included; and for the MAC entity, priority processing, queue scheduling, error correction, and the like at the MAC layer are included. Unlike the prior art, the processing is central processing on data packets before offloading, instead of respective processing by different RATs.

Step 510 may further include the following steps.

Step 5101: The MAC entity performs allocation determining for services and/or the data packets.

Step 5102: The MAC entity allocates the services and/or the data packets to a transmit buffer corresponding to at least one HARQ process and/or at least one HARQ entity corresponding to cells of different RATs.

When performing allocation determining, the MAC entity may perform allocation determining according to a quality of service (QoS) parameter of a service. The QoS parameter may include one or more of a tolerant rate, a delay, a priority, or another parameter. These parameters may be configured by a radio resource control (RRC) layer to the MAC layer.

Alternatively, when performing allocation determining, the MAC entity may perform allocation determining according to radio channel statuses corresponding to physical layers of different RATs.

Therefore, before step 310 or step 510 in the foregoing embodiment, the method further includes: The first network node receives a first message, where the first message includes at least one of the following information: radio channel statuses that are reported by the second network node and that are corresponding to the different RATs respectively, information about a RAT selected by the second network node, information about a cell corresponding to a RAT selected by the second network node, or information about a carrier corresponding to a RAT selected by the second network node.

In step 310 or step 510, that the MAC entity allocates the data packets to at least one HARQ unit corresponding to the at least two cells includes:

The MAC entity allocates, according to the information in the first message, the data packets to the at least one HARQ unit corresponding to the at least two cells.

The first message may be directly sent by the second network node to the first network node, or may be indirectly sent by the second network node to the first network node. For example, the second network node sends the first message to a network device corresponding to each cell, and the network device corresponding to each cell sends the first message to the first network node.

Specifically, for a downlink service:

The terminal device performs channel measurement, and reports channel measurement results of all cells to the first network node; or the terminal device separately reports channel measurement results to the network devices of the different RATs, and the network devices of the different RATs send the channel measurement results of all cells to the first network node.

The channel measurement result may include at least one of a rank indication (RI), a precoding matrix indication (PMI), a signal to interference plus noise ratio (SINR), or the like. In this way, the MAC entity may allocate, according to the channel measurement results corresponding to the at least two cells respectively, the data packets to the at least one HARQ unit corresponding to the at least two cells.

When the MAC entity allocates the data packets, channel statuses of different RATs are considered. Therefore, the MAC entity can allocate more data packets to a RAT with a better channel status, or allocate a service with a higher reliability requirement to a RAT with a better channel status, so as to effectively perform RAT selection, and improve data transmission reliability.

Specifically, the terminal device may separately send the channel measurement results of the different RATs to a sending device or the network devices corresponding to the different RATs, or may send the channel measurement results to the first network node by using a public message. Optionally, the message for sending the channel measurement results may be physical layer signaling, or may be a MAC control element (MAC CE).

Optionally, the terminal device may further report, to the sending device by using the physical layer signaling or the MAC CE, at least one type of RAT selected by the terminal device. Further, the terminal device may further send, to the sending device, a corresponding data packet allocation proportion of the RAT selected by the terminal device. The data packet allocation proportion may be independently sent, or may be carried in the physical layer singling or the MAC CE, and sent to the first network node together with the at least one type of RAT selected by the terminal device.

For an uplink service:

The terminal device selects the at least two cells according to the measured channel measurement results of the different cells.

Optionally, when the terminal device sends a buffer status report (BSR), the BSR further carries information about a RAT or information about a cell, a carrier, a logic channel, or a logical channel group corresponding to a RAT.

Optionally, when the terminal device sends a scheduling request (SR), the SR further carries information about a RAT or information about a cell or a carrier corresponding to a RAT.

Optionally, when the second network node configures or modifies an uplink rate control parameter of the terminal device, such as a priority and a prioritized bit rate (PBR) of a radio bearer (RB), a characteristic and a priority of the RAT are considered. That is, the second network node sets the uplink rate control parameter of the terminal device according to the characteristic and the priority of the RAT.

Further, in the foregoing embodiment, a radio resource control (RRC) layer and/or radio resource management (RRM) send/sends, to the MAC entity, an average packet loss rate of each cell of different RATs and/or average channel utilization of each cell of different RATs. Therefore, in the foregoing embodiment, when allocating the data packets, the MAC entity may perform allocation determining according to the average packet loss rate of each cell of the different RATs and/or the average channel utilization of each of the different RATs.

Certainly, the MAC entity may allocate the data packets according to one or any combination of the foregoing parameters.

In this embodiment, the QoS parameter of the service, such as the tolerant rate, the delay, or the priority, the radio channel statuses corresponding to the physical layers of the different standards, and the average packet loss rate and the average channel utilization of the different RATs are considered in data packet allocation, so as to ensure a better packet allocation proportion and a minimum receive end delay.

Further, when allocating the data packets, the MAC entity may further select a RAT according to characteristics of different RATs, so as to select an optimum RAT. The characteristics of the RATs may include at least one of a transmission time interval (TTI), a transport format (TF) of a transport channel, or a coding parameter. The coding parameter may include at least one of a size of error correcting code, a coding type, or a coding rate. In this way, the MAC entity allocates the data packets according to the characteristics of the different RATs, so that a radio characteristic of the selected RAT better matches a characteristic of a service that needs to be served. For example, characteristics of the coding rate, the transport format of the transport channel, and the TTI are related to a service rate and a network processing delay; and the size of the error correcting code and the coding type are related to a bit error rate that a service can tolerate. Therefore, when allocation determining is performed, considering the characteristics of the coding rate, the transport format of the transport channel, and the TTI, the service rate, and the like can reduce a network processing delay. In addition, when allocation determining is performed, considering the size of the error correcting code, the coding type, the bit error rate that the service can tolerate, and the like can reduce a bit error rate.

Further, after the MAC entity allocates the data packets to the HARQ entity and/or the HARQ process corresponding to the at least two cells, the MAC entity may map different transport channels and logical channels of the different RATs according to allocation results.

Optionally, all the different RATs may reuse a transport channel and logical channel mapping manner currently defined by LTE. Particularly, a 5G network may perform transport channel and logical channel mapping according to a current LTE network manner.

Further, the MAC entity of the first network node further performs a corresponding MAC operation, including a HARQ operation. In addition, the MAC operation may further include a discontinuous reception (DRX) operation and/or a semi-persistent scheduling (SPS) operation.

For the HARQ operation, the MAC entity of the first network node maintains at least one HARQ entity for each serving cell, and each HARQ entity may keep a plurality of HARQ processes. A serving cell may be a carrier, or may be a cell. One type of RAT may include one or more serving cells.

In this embodiment of the present invention, the HARQ entity maintained by the MAC entity of the first network node is corresponding to at least two RATs, and TTI values and/or cyclic prefixes (CP) of different RATs may be different. Therefore, HARQ timing of HARQ entities and/or HARQ processes corresponding to cells of the different RATs may be different. Specifically, timing of the HARQ entities corresponding to the cells of the different RATs may be different, but timing of all HARQ processes in each HARQ entity is the same; or timing of all HARQ processes of the HARQ entities corresponding to the cells of the different RATs may be different. Therefore, in this embodiment of the present invention, to implement HARQ operations of different HARQ timing, different HARQ round trip time (RTT) timing times need to be configured for serving cells of the different RATs. Therefore, in this embodiment of the present invention, an access network device may further send, to the terminal device, a HARQ RTT timing time corresponding to each of the cells of the different RAT.

Further, the access network device may configure different HARQ RTT timing times or a HARQ RTT timing time list for the cells of the different RATs by assigning a value to a variable HARQ RTT Timer. Specifically, the value may be assigned to the HARQ RTT Timer by using a MAC-MainConfigSCell-rxy information element in an RRC reconfiguration message, and this may be implemented in the following manner:

```
MAC-MainConfigSCell-rxy ::=     SEQUENCE {
stag-Id-r11 STAG-Id-r11         OPTIONAL,
    HARQInformation (or just an index from a specified table, or a
pattern)
HARQ RTT timer or HARQ RTT timerList
...
}
```

In this embodiment, the value of the HARQ RTT Timer may use a definition of HARQ information in a corresponding RAT.

In the prior art, the MAC entity does not maintain the HARQ entities of the different RATs. Therefore, the HARQ timing of all HARQ entities is the same. In addition, in the prior art, the value of the HARQ RTT Timer is constant, where there are eight subframes in FDD, and k+4 subframes in TDD. Therefore, RRC signaling in the prior art does not carry the HARQ RTT timing time or the HARQ RTT timing time list.

For a DRX operation, the terminal device may use different radio frequency units to receive data packets of different RATs. In this case, the terminal device may use different DRX configurations for different RATs. Therefore, in this embodiment of the present invention, the access network device may further send different DRX configurations to the terminal device. The terminal device performs DRX according to the DRX configurations.

The DRX configurations may include a DRX configuration in the prior art, for example:

(1) at least one of an on duration timer (onDurationTimer), a DRX inactivity timer (drx-InactivityTimer), a DRX retransmission timer (drx-RetransmissionTimer), or a mac-contention resolution timer (mac-ContentionResolutionTimer), where during running of the four types of timers, a receive antenna is enabled to monitor a PDCCH.

(2) a DRX cycle and a start offset.

Unlike those in the prior art, the DRX configurations in this embodiment of the present invention are for different RATs.

Optionally, the DRX configurations may indicate a type of a physical channel that needs to be listened on by the terminal device, for example, PDCCH for LTE, PxCCH for 4.5G, or PyCCH for 5G.

In the prior art, if a DRX function is configured for the terminal device, the terminal device uses a DRX operation specification, and discontinuously listens on a physical downlink control channel (PDCCH). If a DRX function is not configured for the terminal device, the terminal device continuously listens on a PDCCH. When the DRX function is configured for the terminal device, the terminal device listens on the PDCCH in an active period.

In this embodiment of the present invention, the terminal device determines, according to the DRX configuration, a type of a physical channel that needs to be listened on.

In addition, in the prior art, DRX application further requires the HARQ RTT Timer, so that the terminal device can determine that retransmission data sent by a base station may appear how many subframes later at the earliest. In the prior art, the value of the HARQ RTT Timer is constant, where there are eight subframes in FDD, and k+4 subframes in TDD. Therefore, the RRC signaling does not carry the value of the HARQ RTT Timer. However, in this embodiment of the present invention, the HARQ timing of the HARQ entities and/or processes corresponding to the cells of the different RATs may be different. Therefore, in the DRX configurations, values may be assigned to HARQ RTT Timers of the HARQ entities and/or processes corresponding to the cells of the different RATs.

The DRX configurations may be sent to the terminal device by the access network device by using the RRC reconfiguration message. Specifically, the DRX configurations may be configured in the MAC-MainConfigSCell-rxy information element by using a parameter DRX-Config.

For example, this may be implemented in the following manner:

```
MAC-MainConfigSCell-rxy ::=      SEQUENCE {
stag-Id-r11 STAG-Id-r11     OPTIONAL,
     DRX-Config ...
}
```

For the SPS operation, in the prior art, one terminal device has only one set of SPS configuration parameters. In this embodiment of the present invention, in consideration that radio characteristics of cells corresponding to different RATs are different, the access network device may separately define independent SPS configurations for cells corresponding to different RATs of one terminal.

The SPS configuration may include an SPS configuration parameter in the prior art, for example, at least one of: a semi-persistent scheduling cell radio network temporary identifier (SPS-C-RNTI) used for PDCCH scrambling (16 bits); a semi-persistent scheduling period (there are a minimum of 10 subframes, and a maximum of 640 subframes; and a semi-persistent scheduling period such as 32 subframes, 64 subframes, or 128 subframes that are not a multiple of 10 is further included); a total quantity of HARQ processes for downlink semi-persistent scheduling; an uplink semi-persistent scheduling interval (semiPersistSchedIntervalUL); a downlink semi-persistent scheduling interval (semiPersistSchedIntervalDL); a quantity of implicit deactivated null frames; a quantity of SPS HARQ processes (numberOfConfSPS-Processes); a parameter used for calculating a subframe offset value Subframe_Offset value of the SPS; or the like.

In step 530 and step 540, after receiving corresponding data packets offloaded to the RATs, the network devices of the at least two RAT networks process the data packets by using at least one HARQ process and a baseband processing unit that are of cells corresponding to the RAT networks, and then send processed data packets to the terminal device by using an antenna. As described above, it is optional that the data packets are processed by using the at least one HARQ process of the cells corresponding to the RAT networks.

As a receive end of the data packets, the second network node receives the data packets by using antennas of different RATs, processes the data packets by using a HARQ process and a baseband processing unit at corresponding physical layers, and then sends processed data packets to a shared MAC layer to perform an operation such as demultiplexing. A data packet obtained after demultiplexing is performed at the shared MAC layer is an aggregated data packet. The MAC layer sends the processed data to an RLC layer and a PDCP layer for processing, and the data is finally sent to an application layer.

Description is given by using an uplink service as an example. The network devices of the at least two cells separately receive data packets, and separately process the data packets by using the HARQ process and the baseband processing unit at the physical layer. Then, the network devices of the at least two RAT networks send processed data packets to a network device that has a shared MAC entity. The shared MAC entity performs an operation such as demultiplexing on the data packets received from the at least two RATs, and separately sends processed data packets to the RLC layer and the PDCP layer for processing, and the data packets are finally sent to the application layer.

For a downlink service, processing of the terminal device is similar to this, and details are not described in this specification.

In another optional implementation, in step 510, the MAC entity allocates the data packets to a HARQ entity shared by the at least two RAT networks.

In this implementation, the at least two cells share at least one HARQ entity, and the HARQ entity maintains different HARQ processes. For a processing manner in this embodiment, refer to the description in the foregoing. Same content is not described again.

The MAC entity sends the data packets to the at least one HARQ entity shared by the at least two cells, and the data packets are processed by the HARQ processes maintained by the HARQ entity.

For example, when the data packets are same data packets of a same service, the data packets include a first data packet and a second data packet, and the first data packet and the second data packet are the same data packets of the same service. That is, the first data packet and the second data packet are the same data packet. The first data packet is allocated to a first cell in the at least two cells, and the second data packet is allocated to a second cell in the at least two cells. When the at least two cells share one HARQ entity, the first data packet and the second data packet are corresponding to one HARQ process, and the HARQ process is maintained by the HARQ entity. In this case, it may also be considered that the at least two cells may also share one HARQ process.

Likewise, the second network node only needs to receive data by using antennas of different RATs, processes the data at corresponding physical layers, then sends processed data to a joint MAC layer for demultiplexing, sends demultiplexed data to the RLC layer and the PDCP layer for processing, and finally sends processed data to an upper-layer (the application layer).

In this embodiment of the present invention, the shared MAC layer is used for implementing the multi-standard radio network coordination technology, and a new technology that can implement tight coupling coordination of multi-standard radio networks is used. The sending device that has the shared MAC layer may aggregate service data of radio networks of different standards at the MAC layer, and effectively map the service data onto the radio networks of the different standards, so as to ensure smooth merging of different network deployment. Further, in this embodiment of the present invention, service offloading can be effectively performed based on a radio link status, so as to reduce an end-to-end delay, an average residence serving time, and a waiting time in a buffer. Therefore, coordination among the radio networks of different standards can further achieve a carrier aggregation (CA) effect in LTE.

Figure 6:
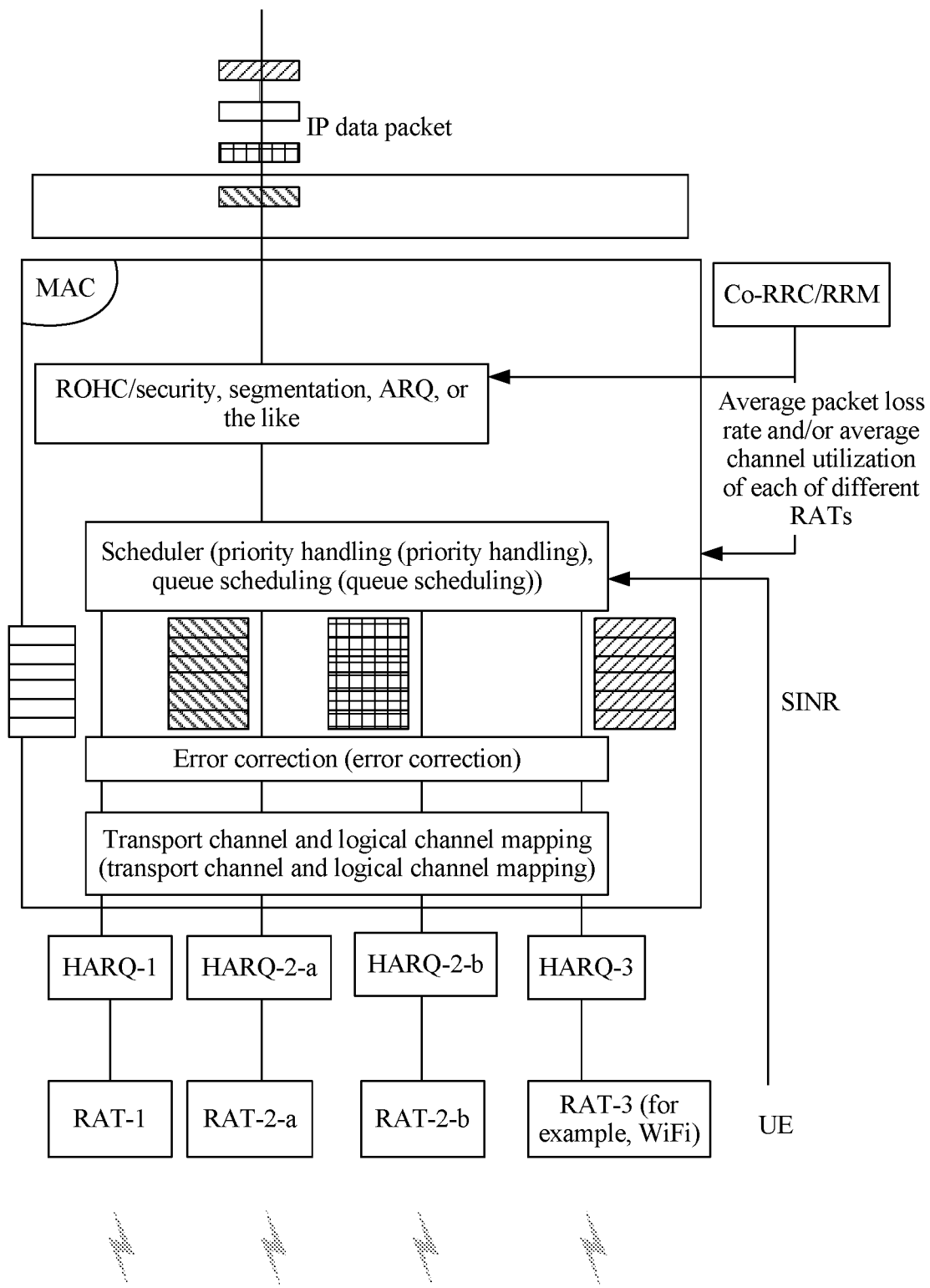
FIG. 6 is a schematic structural diagram of a protocol stack according to another embodiment of the present invention.

A protocol stack according to another embodiment of the present invention may be shown in FIG. 6. A difference between this embodiment and the foregoing embodiment lies in that a PDCP entity and an RLC entity are canceled, and functions, function subsets, or enhanced functions corresponding to the PDCP entity and the RLC entity are all integrated into one MAC entity, that is, the MAC entity implements the functions of the PDCP entity and the RLC entity, so that the MAC entity can perform central processing and scheduling on IP data packets at an application layer. For example, the MAC entity performs one or more of ROHC, security, cascading/segmentation, ARQ, or other processing.

In addition, for offloading and another function of the MAC entity, refer to the description in the foregoing embodiment. In this case, the MAC entity directly processes the IP data packets rather than processes data packets processed at a PDCP layer and/or an RLC layer.

This embodiment of the present invention can achieve the effect of the foregoing embodiment. In addition, based on the foregoing embodiment, in this embodiment of the present invention, processing does not need to be separately performed at the PDCP layer and the RLC layer, so that processing is more concise, and a delay is shorter.

To implement the foregoing embodiment, an embodiment of the present invention further provides a network device. It should be noted that the network device can implement the method in the foregoing embodiment, and therefore, for specific details, refer to the description in the foregoing embodiment. For brevity, same content is not described in the following.

Figure 7:
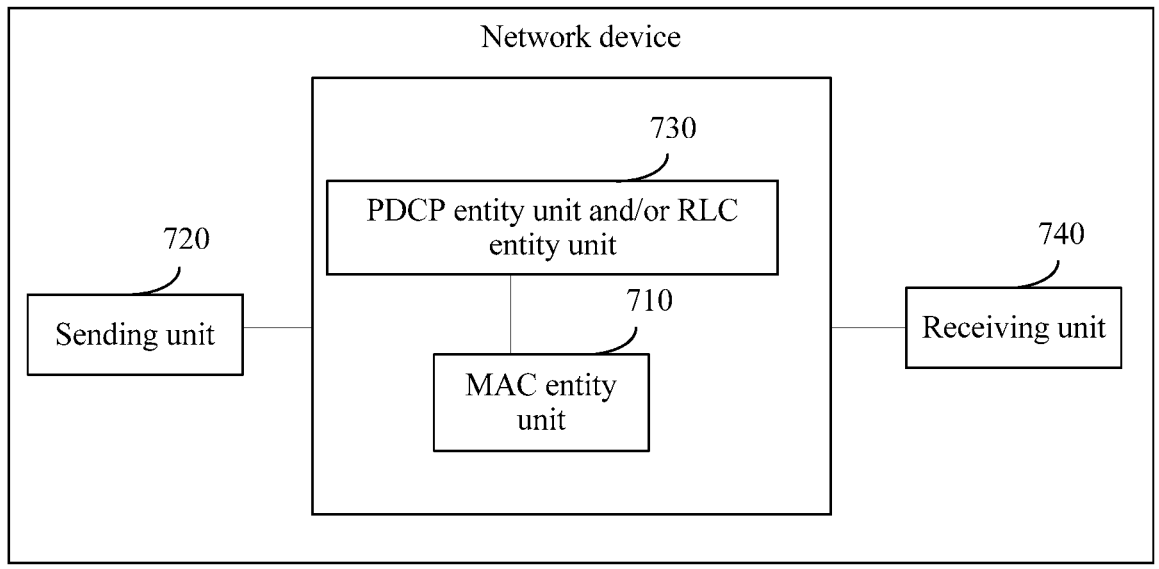
FIG. 7 is a schematic structural diagram of a network device according to an embodiment of the present invention.

As shown in FIG. 7, the network device may include a MAC entity unit 710 and a sending unit 720. The network device is referred to as a first network node. The MAC entity unit 710 is configured to allocate data packets to at least one HARQ unit corresponding to at least two cells, where the at least two cells use different radio access technologies RATs, the at least two cells share one HARQ unit or each of the at least two cells is corresponding to one HARQ unit, and the HARQ unit is a HARQ entity and/or a HARQ process. The sending unit 720 is configured to send the data packets to a second network node by using the at least two cells.

Optionally, the data packets are different data packets of a same service, or the data packets are same data packets of a same service, or the data packets are data packets of different services.

Further, the data packets include a first data packet and a second data packet, the first data packet is allocated to a first cell in the at least two cells, the second data packet is allocated to a second cell in the at least two cells, and the first data packet and the second data packet are different data packets of a same service, or the first data packet and the second data packet are data packets of different services.

The at least two cells share one HARQ entity, the first data packet and the second data packet are corresponding to different HARQ processes respectively, and the different HARQ processes are maintained by the HARQ entity; or each of the at least two cells is corresponding to one HARQ entity, the first cell is corresponding to a first HARQ entity, the second cell is corresponding to a second HARQ entity, the first data packet is corresponding to a first HARQ process, the first HARQ process is maintained by the first HARQ entity, the second data packet is corresponding to a second HARQ process, and the second HARQ process is maintained by the second HARQ entity.

Alternatively, the data packets include a first data packet and a second data packet, the first data packet and the second data packet are same data packets of a same service, the first data packet is allocated to a first cell in the at least two cells, and the second data packet is allocated to a second cell in the at least two cells.

The at least two cells share one HARQ entity, the first data packet and the second data packet are corresponding to one HARQ process, and the HARQ process is maintained by the HARQ entity; or each of the at least two cells is corresponding to one HARQ entity, the first cell is corresponding to a first HARQ entity, the second cell is corresponding to a second HARQ entity, the first data packet is corresponding to a first HARQ process, the first HARQ process is maintained by the first HARQ entity, the second data packet is corresponding to a second HARQ process, and the second HARQ process is maintained by the second HARQ entity.

Optionally, the network device further includes a PDCP entity unit and/or an RLC entity unit 730.

The PDCP entity unit and/or the RLC entity unit 730 are/is configured to process application layer data packets to obtain the data packets. It should be noted that herein, the PDCP entity unit and/or the RLC entity unit may mean that there is only the PDCP entity unit, or there is only the RLC entity unit, or there are both the PDCP entity unit and the RLC entity unit. Specifically, if there is only the PDCP entity unit, the PDCP entity unit is configured to perform PDCP layer processing on the application layer data packets to obtain the data packets. A function of an RLC layer may be implemented by the PDCP entity unit, or may be implemented by the MAC entity unit. If there is only the RLC entity unit, the RLC entity unit is configured to process the application layer data packets to obtain the data packets. In this case, the RLC entity unit may be further capable of performing corresponding PDCP layer processing on the application layer data packets. If the network device includes the PDCP entity unit and the RLC entity unit, the PDCP entity unit is configured to perform PDCP layer processing on the application layer data packets to obtain PDCP data packets, and the RLC entity unit is configured to perform RLC layer processing on the PDCP data packets to obtain the data packets. Then, the MAC entity unit 710 allocates the data packets to the at least one HARQ unit corresponding to the at least two cells.

Optionally, the MAC entity unit 710 is further configured to process the application layer data packets to obtain the data packets.

Further, the MAC entity unit 710 is configured to allocate, in the following manner, the data packets to the at least one HARQ unit corresponding to the at least two cells:

allocating the data packets to the at least one HARQ unit corresponding to the at least two cells according to at least one of: a quality of service parameter of a service, radio channel statuses of the different RATs, an average packet loss rate of each of the different RATs, average channel utilization of each of the different RATs, or characteristics of the different RATs. For the characteristics of the different RATs, refer to the description in the foregoing.

Further, the network device may further include a receiving unit 740.

The receiving unit 740 is configured to receive a first message, where the first message includes at least one of the following information: radio channel statuses corresponding to the different RATs respectively, information about a RAT selected by the second network node, information about a cell corresponding to a RAT selected by the second network node, or information about a carrier corresponding to a RAT selected by the second network node; and the MAC entity unit 710 is specifically configured to allocate, in the following manner, the data packets to the at least one HARQ unit corresponding to the at least two cells:

allocating, according to the information in the first message, the data packets to the at least one HARQ unit corresponding to the at least two cells.

Further, the receiving unit 740 may be further configured to receive an uplink rate control parameter sent by the second network node, where the uplink rate control parameter is set according to the characteristics and priorities of the RATs corresponding to the at least two cells; and the MAC entity unit 710 is specifically configured to allocate, in the following manner, the data packets to the at least one HARQ unit corresponding to the at least two cells: allocating, according to the uplink rate control parameter, the data packets to the at least one HARQ unit corresponding to the at least two cells.

Further, the sending unit 720 is further configured to: directly or indirectly send a buffer status report BSR to the second network node, where the BSR includes information about a RAT selected by the first network node or information about cells, carriers, logical channels, or logical channel groups corresponding to the different RATs; and/or directly or indirectly send a scheduling request SR to the second network node, where the SR includes information about the at least two RATs or information about cells, carriers, logical channels, or logical channel groups corresponding to the at least two RATs.

Further, the receiving unit 740 may be further configured to: after the sending unit 720 directly or indirectly sends the buffer status report BSR to the second network node, and/or directly or indirectly sends the scheduling request SR to the second network node, receive resource scheduling information sent by the second network node, where the resource scheduling information includes resources that are of the at least two cells and that are allocated by the second network node to the first network node; and the MAC entity unit 710 is specifically configured to allocate, in the following manner, the data packets to the at least one HARQ unit corresponding to the at least two cells: The MAC entity unit allocates the data packets to the at least one HARQ unit corresponding to the at least two cells according to the resources that are of the at least two cells and that are allocated by the second network node to the first network node.

Further, each of the at least two cells is corresponding to one HARQ unit, one of the first network node and the second network node is an access network device, and the other one of the first network node and the second network node is a terminal device; and the sending unit 720 is further configured to: before the MAC entity unit 710 allocates the data packets to HARQ processes of at least two RAT networks, send a second message to the terminal device, where the second message includes configuration information of HARQ round trip time RTT timing time of a cell corresponding to each of the different RATs, and/or configuration information of discontinuous reception DRX of a cell corresponding to each of the different RATs.

In this embodiment, for a definition of each parameter and a specific implementation of each step, refer to the description in the foregoing.

It should be noted that each module of the network device performs information exchange, an execution process, and other content of the method in another embodiment of the present invention. For details, refer to the description in the method embodiment. In addition, this network device embodiment and the foregoing method embodiment are based on a same conception, and a technical effect of this embodiment is the same as that in the method embodiment of the present invention. For specific content, refer to the description in the method embodiment of the present invention. Details are not described herein.

It should be noted that in the foregoing network device embodiment, division of each functional module is only an example for description. In an actual application, according to a requirement, for example, according to a configuration requirement of corresponding hardware or consideration of convenience for implementation of software, the foregoing functions may be allocated to different functional modules for completion. That is, internal structures of the user equipment and a bastion station are divided into different functional modules, so as to complete all or a part of functions described above. Moreover, in actual application, corresponding functional modules in this embodiment may be implemented by corresponding hardware, or may be completed by corresponding hardware by executing corresponding software. For example, the sending unit 720 may be hardware that has a function of executing the sending unit, such as a transmitter, or may be a general processor or another hardware device that can execute a corresponding computer program, so as to complete the foregoing function. For another example, the MAC entity unit 710, the PDCP entity unit and/or the RLC entity unit 730 may be hardware that has a function of executing the processing unit, such as a processor, or may be another hardware device that can execute a corresponding computer program, so as to complete the foregoing functions. For still another example, the receiving unit may be hardware that has a function of executing the receiving unit, such as a receiver, or may be a general processor or another hardware device that can execute a corresponding computer program, so as to complete the foregoing functions.

Figure 8:
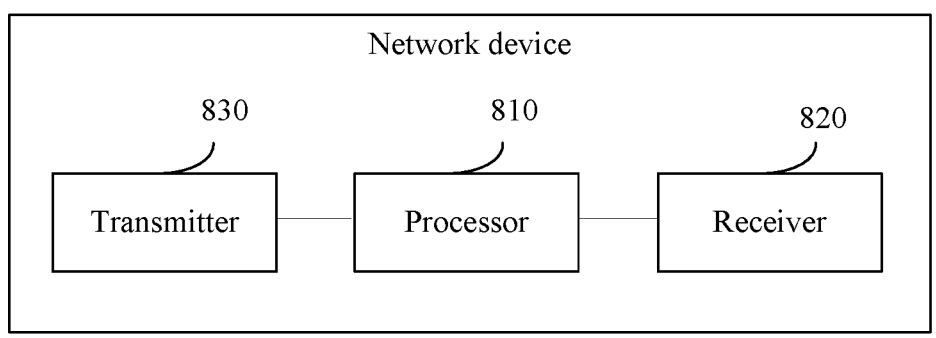
FIG. 8 is a schematic structural diagram of another network device according to an embodiment of the present invention.

Therefore, as shown in FIG. 8, an embodiment of the present invention further provides a network device that can perform the method in the foregoing embodiment. The network device includes a processor 810, a receiver 820, and a transmitter 830. The processor 810 is communicatively connected to the receiver 820 and the transmitter 830. The processor 810 can implement the functions of the MAC entity unit 710 and the PDCP entity unit and/or the RLC entity unit 730 that are in the embodiment corresponding to FIG. 7. The receiver 820 can implement the function of the receiving unit 740 in the embodiment corresponding to FIG. 7. The transmitter can implement the function of the sending unit 720 in the embodiment corresponding to FIG. 7.

It should be noted that the network devices shown in FIG. 7 and FIG. 8 may be terminal devices, or may be access network devices, or may be core network devices. For this, refer to the description of the first network node in the foregoing.

In addition, an embodiment of the present invention further provides a wireless communications system, including the first network node and the second network node in the foregoing embodiment. Further, the wireless communications system may further include one or more network devices corresponding to the at least one cell in the foregoing embodiment.

A person of ordinary skill in the art may understand that all or a part of the steps of the methods in the embodiments may be implemented by a program instructing relevant hardware. The program may be stored in a computer readable storage medium. The storage medium may include: a read-only memory (ROM), a random access memory (RAM), a magnetic disk, or an optical disc.

The foregoing introduces in detail the method, the user equipment, and the base station provided in the embodiments of the present invention. Specific examples are used in this specification to describe the principle and implementations of the present invention. The descriptions of the foregoing embodiments are merely intended to help understand the method and core idea of the present invention. In addition, a person skilled in the art may, according to the idea of the present invention, make modifications with respect to the specific implementations and the application scope. Therefore, the content of this specification shall not be construed as a limitation on the present invention.

What is claimed is:

1. A method performed by an access network device, the method comprising:
    sending a message to a terminal device,
        wherein the access network device comprises a processor that maintains a single media access control (MAC) entity in a MAC layer and at least two hybrid automatic repeat request (HARQ) entities,
        wherein the MAC entity is shared by at least two cells,
        wherein each of the at least two HARQ entities corresponds to one of the at least two cells,
        wherein the message comprises configuration information of HARQ round trip time (RTT) timing length of the at least two cells and configuration information of discontinuous reception (DRX) of the at least two cells, and
        wherein the at least two cells use different transmission time intervals (TTI) and/or different cyclic prefixes (CP);
    allocating, by using the single MAC entity data packets to the at least two HARQ entities corresponding to the at least two cells, and
    transmitting the data packets to the terminal device by using the at least two cells.

2. The method according to claim 1, wherein the method further comprises:
    receiving a scheduling request (SR) from the terminal device, wherein the SR comprises information about logical channels, or logical channel groups corresponding to the at least two cells RATS.

3. The method according to claim 1, wherein the configuration information of DRX comprises a type of a physical channel that needs to be listened on by the terminal device and/or information about HARQ RTT timing time of the at least two cells corresponding to the configuration information of DRX.

4. The method according to claim 1, wherein the message further comprises a semi-persistent scheduling (SPS) configuration for each of the at least two cells.

5. The method according to claim 1, wherein
    the data packets are different data packets of a same service;
    the data packets are same data packets of a same service; or
    the data packets are data packets of different services.

6. The method according to claim 1, wherein
    the processor further maintains a packet data convergence protocol (PDCP) entity and/or a radio link control (RLC) entity; and
    before allocating the data packets, the method further comprises:
        processing, by using the PDCP entity and/or the RLC entity, application layer data packets to obtain the data packets.

7. The method according to claim 1, wherein allocating the data packets to the at least two HARQ entities corresponding to the at least two cells comprises:
    allocating, by the MAC entity, the data packets to the at least two HARQ entities corresponding to the at least two cells according to at least one of:
    a quality of service parameter of a service,
    radio channel statuses of the at least two cells,
    an average packet loss rate of each of the at least two cells, or
    average channel utilization of each of the at least two cells.

8. An access network device comprising:
    a processor;
    a memory storing executable instructions;
    wherein the processor is configured to execute the executable instructions to perform operations of:
        maintaining a single media access control (MAC) entity at a MAC layer and at least two hybrid automatic repeat request (HARQ) entities, wherein the MAC entity is shared by at least two cells, and each of the at least two HARQ entities corresponds to one of the at least two cells;
        sending a message to a terminal device, wherein the message comprises configuration information of HARQ round trip time (RTT) timing length of the at least two cells and configuration information of discontinuous reception (DRX) of the at least two cells, wherein the at least two cells use different transmission time intervals (TTI) and/or different cyclic prefixes (CP);
        allocating, using the single MAC entity, data packets to the at least two HARQ entities corresponding to the at least two cells; and
        transmitting the data packets to the terminal device by using the at least two cells.

9. The access network device according to claim 8, wherein the processor is further configured to perform an operation of:
    receiving a scheduling request (SR), wherein the SR comprises information about logical channels, or logical channel groups corresponding to the at least two cells RATS.

10. The apparatus according to claim 8, wherein the configuration information of DRX comprises a type of a physical channel that needs to be listened on by the terminal device and/or information about HARQ RTT timing time of the at least two cells corresponding to the configuration information of DRX.

11. The access network device according to claim 8, wherein the message further comprises a semi-persistent scheduling (SPS) configuration for each of the at least two cells.

12. The access network device according to claim 8, wherein
    the data packets are different data packets of a same service;
    the data packets are same data packets of a same service; or
    the data packets are data packets of different services.

13. The access network device according to claim 8, wherein
    the processor is further configured to perform operations of:
        maintaining a packet data convergence protocol (PDCP) entity and/or a radio link control (RLC) entity;
        processing, using the PDCP entity and/or the RLC entity, application layer data packets to obtain the data packets.

14. The access network device according to claim 9, wherein
the data packets are allocated to the at least two HARQ entities corresponding to the at least two cells according to at least one of:
a quality of service parameter of a service,
radio channel statuses of the at least two cells,
an average packet loss rate of each of the at least two cells, or average channel utilization of each of the at least two cells.

15. A non-transitory computer-readable storage medium comprising instructions which, when executed by a processor, cause the processor to carry out operations including:
sending a message to a terminal device, wherein the message comprises configuration information of hybrid automatic repeat request (HARQ) round trip time (RTT) timing length of at least two cells and configuration information of discontinuous reception (DRX) of the at least two cells, and the at least two cells use different transmission time intervals (TTI) and/or different cyclic prefixes (CP);
operating, in a media access control (MAC) layer, a single MAC entity to allocate data packets to at least two HARQ entities corresponding to the at least two cells, wherein the single MAC entity being shared by the at least two cells using different transmission time intervals (TTI) and/or different cyclic prefixes (CP), and each of the at least two HARQ entities corresponds to one of the at least two cells; and
transmitting the data packets to the terminal device by using the at least two cells.

16. The non-transitory computer-readable storage medium according to claim 15, wherein the instructions further cause the processor to carry out operations including:
receiving a scheduling request (SR) from the terminal device, wherein the SR comprises information about logical channels, or logical channel groups corresponding to the at least two cells.

17. The non-transitory computer-readable storage medium according to claim 15, wherein the configuration information of DRX comprises a type of a physical channel that needs to be listened on by the terminal device and/or information about HARQ RTT timing time of the at least two cells corresponding to the configuration information of DRX.

18. The non-transitory computer-readable storage medium according to claim 15, wherein the message further comprises a semi-persistent scheduling (SPS) configuration for each of the at least two cells.

* * * * *

UNITED STATES PATENT AND TRADEMARK OFFICE
CERTIFICATE OF CORRECTION

PATENT NO. : 10,778,375 B2  
APPLICATION NO. : 16/041511  
DATED : September 15, 2020  
INVENTOR(S) : Chai et al.

Page 1 of 1

It is certified that error appears in the above-identified patent and that said Letters Patent is hereby corrected as shown below:

In the Claims

Claim 2, Column 27, Line 40: "to the at least two cells RATS." should read -- to the at least two cells. --.

Claim 9, Column 28, Lines 40-41: "to the at least two cells RATS." should read -- to the at least two cells. --.

Claim 14, Column 29, Line 1: "The access network device according to claim 9," should read -- The access network device according to claim 8 --.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*